(12) United States Patent
Malasky et al.

(10) Patent No.: US 7,966,599 B1
(45) Date of Patent: Jun. 21, 2011

(54) RUNTIME LIBRARY INCLUDING A VIRTUAL FILE SYSTEM

(75) Inventors: Ethan Malasky, San Francisco, CA (US); Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1331 days.

(21) Appl. No.: 11/513,318

(22) Filed: Aug. 29, 2006

(51) Int. Cl.
*G06F 9/44* (2006.01)
*G06F 9/45* (2006.01)

(52) U.S. Cl. .......................... 717/100; 717/101; 717/120

(58) Field of Classification Search .......... 717/100–103, 717/120, 124, 129, 121, 125, 130, 104
See application file for complete search history.

(56) References Cited

U.S. PATENT DOCUMENTS

| | | | | |
|---|---|---|---|---|
| 6,161,139 | A * | 12/2000 | Win et al. | 709/225 |
| 6,418,444 | B1 * | 7/2002 | Raduchel et al. | 717/126 |
| 6,618,855 | B1 * | 9/2003 | Lindholm et al. | 717/126 |
| 6,684,387 | B1 * | 1/2004 | Acker et al. | 717/126 |
| 6,687,745 | B1 | 2/2004 | Franco et al. | |
| 6,742,176 | B1 * | 5/2004 | Million et al. | 717/120 |
| 6,748,591 | B1 * | 6/2004 | Lewallen | 717/170 |
| 6,766,314 | B2 | 7/2004 | Burnett | |
| 6,766,481 | B2 * | 7/2004 | Estep et al. | 717/124 |
| 6,842,770 | B1 | 1/2005 | Serlet et al. | |
| 6,941,470 | B1 | 9/2005 | Jooste | |
| 7,013,392 | B1 | 3/2006 | Sasaki et al. | |
| 7,076,784 | B1 * | 7/2006 | Russell et al. | 719/315 |
| 7,127,700 | B2 * | 10/2006 | Large | 717/100 |
| 7,185,319 | B2 * | 2/2007 | Kaler et al. | 717/124 |
| 7,331,035 | B2 * | 2/2008 | Loos et al. | 717/104 |
| 7,409,675 | B2 * | 8/2008 | Brumme et al. | 717/114 |
| 7,467,370 | B2 * | 12/2008 | Proudler et al. | 717/100 |
| 7,496,887 | B2 * | 2/2009 | Grasselt et al. | 717/101 |
| 7,503,031 | B2 * | 3/2009 | Chang et al. | 717/101 |
| 7,584,451 | B2 * | 9/2009 | Iborra et al. | 717/101 |
| 7,669,177 | B2 * | 2/2010 | Gerber et al. | 717/100 |
| 7,734,914 | B1 | 6/2010 | Malasky | |
| 7,788,730 | B2 * | 8/2010 | Dean et al. | 726/30 |
| 7,818,721 | B2 * | 10/2010 | Sundararajan et al. | 717/130 |
| 7,865,875 | B2 * | 1/2011 | Hockenberry et al. | 717/120 |
| 7,873,940 | B2 * | 1/2011 | Sanghvi et al. | 717/102 |
| 2003/0061278 | A1 | 3/2003 | Agarwalla et al. | |
| 2003/0236850 | A1 | 12/2003 | Kodama | |

(Continued)

OTHER PUBLICATIONS

Ludwig et al, "File system encryption with integrated user management", ACM SIGOPS, 88-93, 2001.*

(Continued)

*Primary Examiner* — Anil Khatri
(74) *Attorney, Agent, or Firm* — Fish & Richardson P.C.

(57) ABSTRACT

This specification describes technologies relating to a runtime library including a virtual file system. In general, a method can include interfacing with an operating system of a computer; and providing runtime services, including a virtual file system, to programs running on the computer. Providing runtime services can include receiving first information and second information through a single file access routine of an API for the virtual file system; determining a selected one of multiple file storage areas to access based on the first information, the multiple file storage areas including a first local area accessible by a first program and inaccessible by a second program, and a second area accessible by the first program and the second program; mapping the second information to file resource(s) in the selected file storage area in the virtual file system; and accessing the one or more file resources for the first program.

27 Claims, 2 Drawing Sheets

U.S. PATENT DOCUMENTS

2005/0120242 A1     6/2005   Mayer et al.

OTHER PUBLICATIONS

Robinson et al, "Implementiing middleware for content filtering and information flow control", ACM CSAW, pp. 47-53, 2007.*

Vazhkudai et al, "Constructing collaborative desktop storage caches for large scientific datasets", ACM Trans. on storage, vol. 2, No. 3, pp. 221-254, 2006.*

Damiani et al, "A fine grained access control system for XML documents", ACM Trans. on Information and System Security, vol. 5, No. 2, pp. 169-202, 2002.*

Nguyen, USPTO Nonfinal Office Action in U.S. Appl. No. 11/219,235, mailed Jan. 8, 2009, to be published by USPTO as part of the file history, 25 pages.

Nguyen, USPTO Final Office Action in U.S. Appl. No. 11/219,235, mailed May 4, 2009, to be published by USPTO as part of the file history, 24 pages.

Berners-Lee, et al. "Uniform Resource Locators (URL)", Dec. 1994, retrieved from the internet at http://www.ietf.org/rfc/rfc1738.txt, on Jul. 11, 2006, 21 pages.

Berners-Lee, "Universal Resource Identifiers in WWW", Jun. 1994, retrieved from the internet at http://www.ietf.org/rfc/rfc1630.txt, on Aug. 20, 2006, 27 pages.

Brown, "Security Briefs: Strong Names and Security in the .NET Framework" Dec. 2003 retrieved from the internet at http://msdn.microsoft.com/library/default.asp?url=/library/en-us/dnnetsec/html/strongNames.asp?_r=1, on Jul. 11, 2006, 8 pages.

Daniel, "A Trivial Convention for using HTTP in URN Resolution", Jun. 1997, retrieved from the internet at http://www.ietf.org/rfc/rfc2169.txt, on Aug. 20, 2006, 9 pages.

Malasky, "System and Method for Allowing Applications to Securely Access Files", U.S. Appl. No. 11/219,235, filed Sep. 2, 2005, 30 pages.

Microsoft Corporation "IsolatedStorageContainment Enumeration", 2006 retrieved from the internet at http://msdn2.microsoft.com/en-us/library/system.security.pennissions.isolatedstoragecontainment.aspx, on Aug. 25, 2006, 5 pages.

Moats, "URN Syntax", May 1997, retrieved from the internet at http://www.ietf.org/rfc/rfc2141.txt, on Aug. 20, 2006, 8 pages.

Moore, "WebDAV Protocol Comes of Age", Oct. 12, 2001, retrieved from the internet at http://www.infoworld.com/articles/fe/xml/01/10/15/011015feedge, on Aug. 25, 2006, 6 pages.

Open Services Gateway Initiative, "OSGi Service Platform, Release 3", Mar. 2003, 602 pages.

Seda "Strong Names Explained—The Code Project—.NET", Nov. 25, 2004 retrieved from the internet at http://www.codeproject.com/dotnet/StrongNameExplained.asp, on Aug. 4, 2006, 12 pages.

Sun Microsystems Inc. "Security Features Overview", retrieved from the internet at http://java.sun.com/docs/books/tutorial/security/overview/index.html, on Aug. 3, 2006, 7 pages.

Wikipedia.org, "Runtime", retrieved from the internet at http://en.wikipedia.org/wiki/Runtime, on Aug. 25, 2006, 2 pages.

Free On-Line Dictionary of Computing, 1997, http://foldoc.org/pathname and http://foldoc.org/basename, 2 pages.

Valentino, Response to Nonfinal Office Action in U.S. Appl. No. 11/219,235, dated Apr. 3, 2009, to be published by USPTO as part of the file history, 12 pages.

Valentino, Response to Final Office Action in U.S. Appl. No. 11/219,235, dated Jul. 2, 2009, to be published by USPTO as part of the file history, 11 pages.

Nguyen, USPTO Advisory Action in U.S. Appl. No. 11/219,235, dated Jul. 23, 2009, to be published by USPTO as part of the file history, 2 pages.

Valentino, Appeal Brief in U.S. Appl. No. 11/219,235, dated Oct. 5, 2009, to be published by USPTO as part of the file history, 19 pages.

Nguyen, USPTO Notice of Allowance in U.S. Appl. No. 11/219,235, dated Jan. 25, 2010, to be published by USPTO as part of the file history, 14 pages.

* cited by examiner

RUNTIME LIBRARY INCLUDING A VIRTUAL FILE SYSTEM

BACKGROUND

The present disclosure relates to virtual file systems, and in particular, a runtime library including a virtual file system.

A runtime library is a collection of utility functions that support a program while it is running, working with the operating system to provide facilities such as mathematical functions, input and output. The use of a runtime library can simplify the task of coding new applications since a programmer need not continually rewrite basic capabilities that are instead provided by the runtime library. More recent runtime libraries work in conjunction with the operating system of a computer to form a runtime environment that provides programmers with substantial new functionality, above and beyond what the operating system provides, further simplifying the programming task. For example, the JAVA™ Virtual Machine (JVM) is a runtime that provides a dispatcher and classloader for handling inter-process communications and object class definitions, respectively.

Some runtime environments also provide storage access functions that allow a program to create and access a private storage area in a local hard drive, thus allowing a program to have persistent local storage for its private data, while preventing other programs from accessing the program's private data. For example, the JAVA™ security model allows one to set up security privileges such that a particular application can only see part of the hard drive and can only read and write to that part. Also, the .NET™ framework includes an Isolated Storage Containment feature, in which storage can be isolated by user, machine, assembly or domain.

SUMMARY

This specification describes technologies relating to a runtime library including a virtual file system. In general, one aspect of the subject matter described in this specification can be embodied in a method that includes operating on, and interfacing with an operating system of, a computer; and providing runtime services, including a virtual file system, to a first program running on the computer and a second program running on the computer. Providing runtime services includes receiving, from the first program, first information and second information through a single file access routine of an application program interface (API) for the virtual file system; determining a selected one of multiple file storage areas to access based on the first information, the multiple file storage areas including a first area and a second area, the first area being local to the computer, accessible by the first program through the virtual file system and inaccessible by the second program through the virtual file system, and the second area being accessible by the first program and the second program through the virtual file system; mapping the second information to one or more file resources in the selected file storage area in the virtual file system; and accessing the one or more file resources for the first program. Other embodiments of this aspect include corresponding systems, apparatus, and computer program products.

Providing runtime services can include authenticating the first program based at least in part on an identifier associated with the first program The first information can include the identifier. Providing runtime services can include providing runtime services, including the virtual file system, to a third program running on the computer; and authenticating the third program based at least in part on the identifier associated with the first program and with the third program; wherein the first area is accessible by the first and third programs through the virtual file system. Furthermore, the second area can be remote from the computer and accessible over a communication network.

The authenticating can include checking a digital signature for the first program. For example, the checking can include checking a first digital signature of the identifier; and checking a second digital signature of the first program; wherein the first and second digital signatures are created by a common private key. Receiving the first information and the second information can include receiving a character string through the single file access routine of the API for the virtual file system, the character string including the first information and the second information. Moreover, the character string can conform to a Universal Resource Identifiers (URI) specification used for network communications.

According to another aspect, the subject matter described in this specification can be embodied in a system that includes a processor; local storage coupled with the processor; an operating system configured to facilitate access to the processor and the local storage; and a runtime library configured to interface with the operating system while running on the processor. The runtime library can be configured to provide runtime services, including a virtual file system, to a first program running on the processor and a second program running on the processor. The runtime library can include an application program interface (API) for the virtual file system configured to receive, from the first program, first information and second information through a single file access routine of the API for the virtual file system. The runtime library can be configured to determine a selected one of multiple file storage areas to access based on the first information, the multiple file storage areas including a first area and a second area, the first area being in the local storage, accessible by the first program through the virtual file system and inaccessible by the second program through the virtual file system, and the second area being accessible by the first program and the second program through the virtual file system. The runtime library can be configured to map the second information to one or more file resources in the selected file storage area in the virtual file system, and the runtime library can be configured to access the one or more file resources for the first program.

The runtime library can be configured to authenticate the first program based at least in part on an identifier associated with the first program. The first information can include the identifier. The runtime library can be configured to provide runtime services, including the virtual file system, to a third program running on the processor; and the runtime library can be configured to authenticate the third program based at least in part on the identifier associated with the first program and with the third program; wherein the first area is accessible by the first and third programs through the virtual file system.

The system can include an interface device to connect to a communication network, wherein the second area is remote from the processor and accessible over the communication network. The runtime library can be configured to authenticate the first program by checking a digital signature for the first program. The runtime library can be configured to check a first digital signature of the identifier and a second digital signature of the first program; wherein the first and second digital signatures are created by a common private key.

The runtime library can be configured to receive a character string through the single file access routine of the API for the virtual file system, the character string including the first information and the second information. The character string can conform to a URI specification used for network communications.

Particular embodiments of the subject matter described in this specification can be implemented to realize one or more of the following advantages. Application developers can write programs that store and retrieve private data to persistent local storage through an Application Program Interface (API) of a runtime library. Thus, in an enterprise setting (where the enterprise network administrator may not completely trust a new application), an application can store information in a local hard drive (such that the application can retrieve the data the next time it launches) without being given access to all of the data in hard drive. Moreover, the same API interface routine used to access the private data of a program can also be used to access shared memory resources in local storage or other memory resources in remote storage, thus simplifying storage access through the API and potentially simplifying the process of developing new programs to run in the runtime environment provided by the runtime library.

Rogue application programs can be prevented from writing to and reading from local storage in areas that need to be protected (e.g., due to confidential information being kept there). A runtime library can include a resource locator mechanism (resource manager) that, when operating in the runtime environment, employs a resource location mapper that only allows storage resources to be active and accessible through the runtime library if those storage resources are linked to a specific program authorized to access those storage resources. An attempt to access a storage resource by an unauthorized program can thus be prevented by the runtime environment.

In addition, the resource manager in the runtime can operate using URI (Universal Resource Identifier) formatted information exchange between the program and the runtime, e.g., a Universal Resource Locator (URL) style input to the access routine of the API. A URL can be used to gain access to local storage space, where the runtime functions as a URL-to-disk location manager. In general, making a partitioned storage area URI-addressable can allow the same API routine to be used by a program for access to both the partitioned storage area (e.g., the program's private storage partition) and other storage areas, either local or remote. Moreover, using URI style input to the access routine of the API can make it easier for programs with both client and server components to tell the difference between local and remote resource references, and both local and remote resource accesses can be handled cleanly on either a client or a server.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
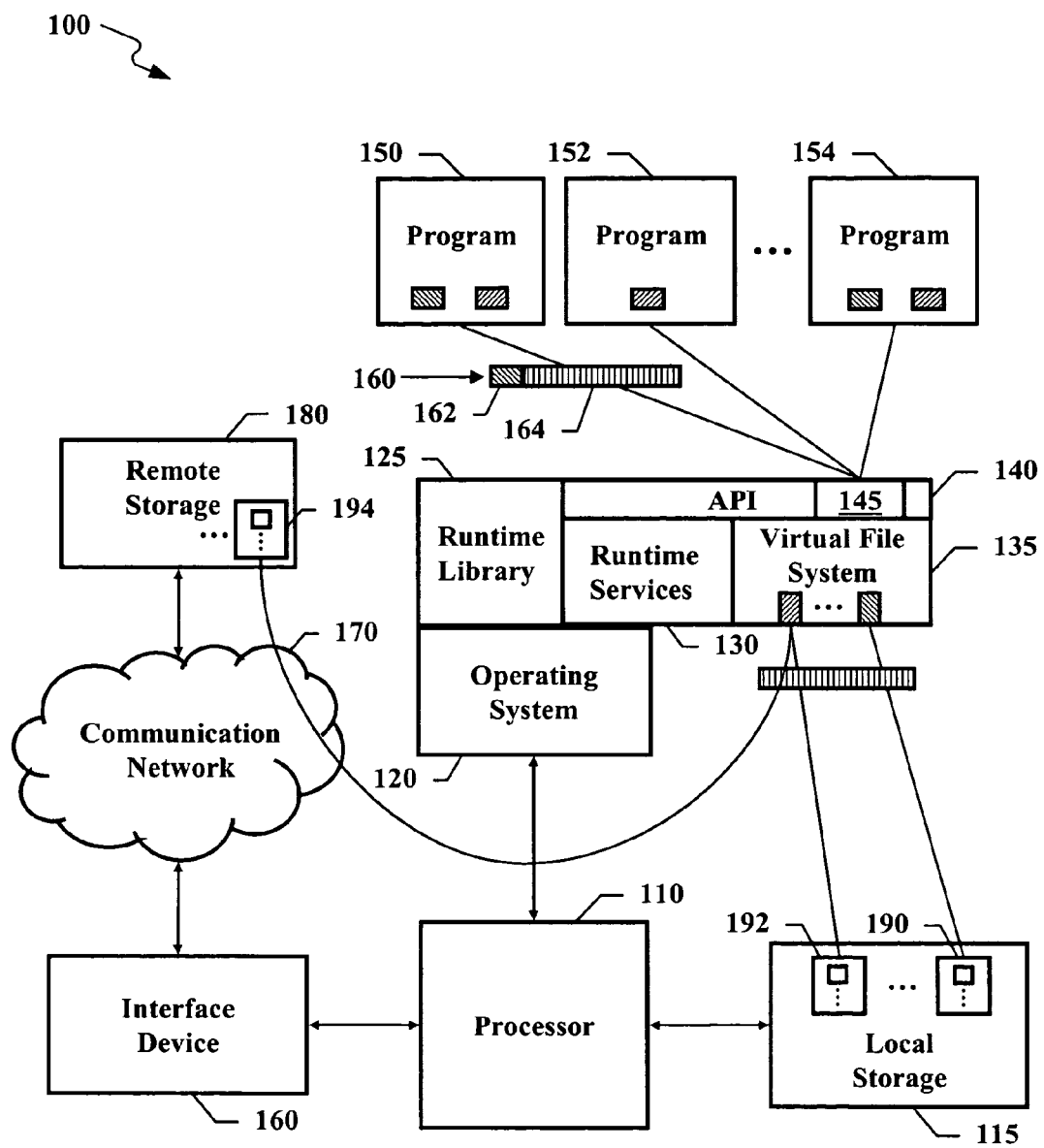
FIG. 1 shows an example system in which a runtime library includes a virtual file system.

FIG. 1 shows an example system 100 in which a runtime library 125 includes a virtual file system 135. A computer includes a processor 110 and local storage 115. The local storage 115 can be any form of non-volatile memory that is local to the computer. The local storage 115 is proximate to the processor 110 (i.e., closer than ten feet) and serves as a local persistent storage resource for programs running on the computer. For example, the local storage 115 can be flash memory coupled with the processor 110 through a Universal Serial Bus (USB) controller (not shown), or the local storage 115 can be a hard drive coupled with the processor 110 through a hard drive controller (not shown).

The computer system includes an operating system 120 configured to facilitate access to the processor 110 and the local storage 115. The computer system includes a runtime library 125 configured to interface with the operating system 120 while running on the processor 110. The runtime library 125 operates on the computer using the operating system 120 to provide a software platform on which other programs run (note that such programs are also referred to as "applications" herein, even when they require the runtime to operate).

The runtime library 125 must be installed on the computer before a program can use it, but the runtime library 125 need not be launched before a program that runs using the runtime library 125, because the program can just call the functions provided by the runtime library 125. However, in some implementations, when a program that uses the library 125 is started, the first code that runs on the computer can be code from the runtime library 125, such as discussed further below in connection with program authentication. Furthermore, in some implementations, application programs designed to run using the runtime library 125 can be required to use the runtime library 125 such that they cannot be run if the runtime library 125 is not present.

The runtime library 125 provides runtime services 130, including a virtual file system 135, to multiple programs 150-154 running on the processor 110. The runtime library 125 includes an application program interface (API) 140 for the virtual file system 135 configured to receive, from a first program 150, information 160 (including first information 162 and second information 164) through a single file access routine 145 of the API 140 for the virtual file system 135. Moreover, the system 100 can also include an interface device 160 to connect to a communication network 170 and access remote storage 180.

The information 160 can be used by the runtime library 125 to determine a file storage area 190-194 to access, and to identify one or more file resources therein. The file storage areas 190-194 can include a first area 190 and a second area 192 or 194. The first area 190 can be in the local storage 115, accessible by the first program 150 through the virtual file system 135 and inaccessible by a second program 152 through the virtual file system 135. The first program 150 includes the first information 162, and the runtime library 125 can authenticate the first program 150 based on an identifier associated with the first program in order to control access to the first area 190 in the local storage 115.

For example, the first information 162 can be the identifier used in authenticating the first program 150. The runtime library 125 can be configured to determine a selected one of the multiple file storage areas 190-194 to access based on the first information 162. Further, the runtime library 125 can be configured to map the second information 164 to one or more file resources in the selected file storage area 190, 192 or 194 in the virtual file system 135.

A file storage area 190, 192 or 194 can be dedicated to a particular application program (e.g., an isolated storage area set aside for a specific program), dedicated to a group of application programs (e.g., a storage area that is shared by a group of programs from the same developer), or generally shared with all programs that access the virtual file system 145 in the runtime library 125. In general, though, the first area 190 can be in the local storage 115, accessible by the first program 150 through the virtual file system 135 and inaccessible by a second program 152 through the virtual file system 135, and the second area 192 or 194 can be in the local storage 115 or in the remote storage 180, and be accessible by the first program 150 and the second program 152 through the virtual file system 135. Moreover, the first and second storage areas can be accessible by a third program 154. As shown in FIG. 1, first green information ▒▒▒▒ is associated with both the first and third programs 150 and 154 (enabling access to the first area 190), and first brown information ▒▒▒ is associated with the first, second and third programs 150-154 (enabling access to the second area 192 or 194).

Thus, the runtime library 125 allows programmers to write applications that can store and retrieve data on a computer in private (or partially private) local storage, such that unauthorized programs cannot access the data through the runtime library 125. These private data storage operations can be performed through the same file access routine 145 used to store and retrieve data in non-private local or remote storage. Moreover, the virtual file system 135 can provide a full file system hierarchy within each file storage area 190, 192, 194, the one or more file resources can correspond to actual file(s) (or portions thereof), and the virtual file system 135 can manage attributes (e.g., owners, authors, date time, etc.) for the one or more file resources. In addition, in some implementations, a storage area (either local or remote) can be accessed through the virtual file system 135 by all programs 150-154 without authentication based on an identifier, if the storage area has unrestricted access.

Figure 2:
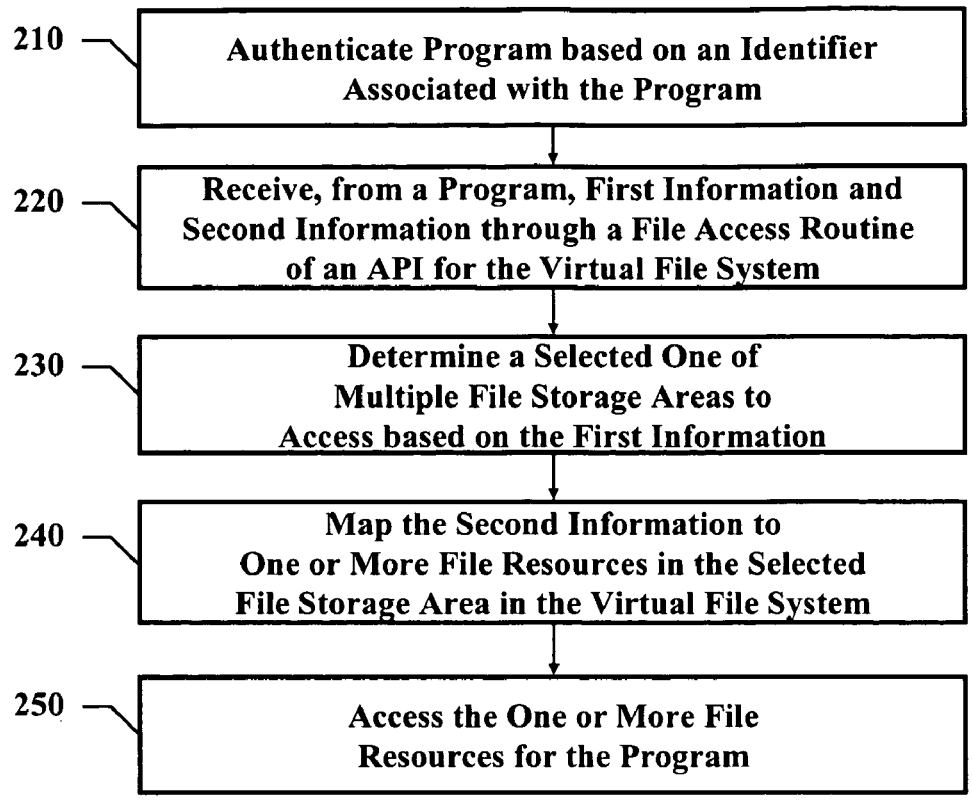
FIG. 2 is a flow chart showing an example process of accessing one or more file resources through a virtual file system.

FIG. 2 is a flow chart showing an example process of accessing one or more file resources through a virtual file system. A program can be authenticated 210 based on an identifier associated with the program. This identifier specifies a storage area, which can be private or shared, and this identifier can be a name of the program or other name. The identifier can be obtained when the program first starts up, and the authentication can be performed before the program attempts a file resource access through the runtime. For example, the identifier can be retrieved by the runtime automatically when the program is invoked, and the authentication performed before the program begins substantial operation.

The identifier can be obtained at the time the program attempts to access a storage area through the runtime. For example, the first information 162 can include the identifier, and when the runtime receives the first information 162 from the program requesting storage access, the runtime can then authenticate the program before providing the requested access. In any event, the program need only be authenticated for use of a given identifier (and its corresponding storage area) one time for each instantiation of the program (a re-authentication of the program need not be performed for each file resource request received), and for an identifier with which all programs may be authorized to use (e.g., "http:") no authentication need be performed.

First information and second information can be received 220, from a program, through a single file access routine of an API for the virtual file system. For example, a character string can be received through the single file access routine 145 of the API 140 for the virtual file system 135, where the character string includes the first information and the second information. The character string can conform to a Universal Resource Identifier (URI) specification used for network communications (e.g., the Network Working Group Request for Comment (RFC) 1630 or RFC 1738). For example, the following API format can be used: Loader.load("app-store://images/image.jpg"); where "Loader.load" is an example of the single file access routine 145, "app-store:" is an example of the identifier included in the first information 162, and "//images/image.jpg" is an example of the second information 164. Note also that a single character string need not be used, and thus the API format can also be: Loader.load("app-store", "/images/image.jpg").

A selected one of multiple file storage areas to access can be determined 230 based on the first information. The multiple file storage areas can include a first area and a second area, the first area being local to the computer, accessible by the first program through the virtual file system and inaccessible by the second program through the virtual file system, and the second area being accessible by the first program and the second program through the virtual file system. The second area can be remote from the computer and accessible over a communication network. Thus, the above example API format can also be used to access Web resources, as in: Loader.load("http://foo.com/pub/app/images/image.jpg"); where "http:" is an example of the first information, and "//foo.com/pub/app/images/image.jpg" is an example of the second information.

The multiple file storage areas can represent various different partitions of local and remote storage. For example, each program that uses the runtime library can be given its own private, sandboxed storage, so every program can get at its own storage space, which is inaccessible by other programs using the runtime library. Access to these private storage areas can be authorized based on a strong name style authentication. Thus, the identifier used to authenticate a program can be the name of the program, and this name can also be the first information 162 provided to the single file access routine 145.

In addition, the identifier can be associated with a group of programs, such as those offered by a particular software developer. Thus, for example, programs developed by Adobe Systems Incorporated to use the runtime library can each include the identifier "Adobe-store:". This identifier can be used for authenticating the programs with respect to the partitioned storage area set aside for these Adobe® programs, and this identifier can also be used to specify this partitioned storage area in the call to the file access routine, as in: Loader.load("Adobe-store://program.alpha/data/file.bk").

The second information can be mapped 240 to one or more file resources in the selected file storage area in the virtual file system. The second information can be in a format that corresponds to a full file system hierarchy for the virtual file system, such as by the use of the slash symbol ("/") to delineate directory structures in the file system hierarchy. In addition, the second information can include formatting conventions to help keep data organized. For example, an Adobe® program alpha and an Adobe® program beta can share data stored in the shared storage area specified by the "Adobe-store:" identifier, but also clearly demarcate their respective data files in the file system hierarchy using the initial directories "//program.alpha/" and "//program.beta/", which correspond to the program names.

The one or more file resources can be accessed 250 for the program in accordance with the mapping. This can involve reading data from or writing data to a file resource, returning a link to the file resource, or returning the file resource itself. Further, it should be noted that the directory structure represented in the second information need not correspond to any actual directory structure maintained by the operating system for the accessed storage. In fact, the system can be designed to deliberately obfuscate the structure and organization of data in the various storage areas in order to help prevent access by any software other than the runtime.

Such obfuscation can also be employed by the program as well; if the runtime library does not provide an interface for discovery of the file system hierarchy in the virtual file system, then a program can use a complicated file system hierarchy in the virtual file system to help secure its private data, since other programs can be kept ignorant of the file system hierarchy and thus not know how to request any data. Other security measures can also be employed to protect the stored data, such as the use of encryption by the runtime in storing data. Moreover, in some implementations, the runtime library can provide an interface for discovery of the file system hierarchy in the virtual file system, including traditional file system constructs for dealing with files in a file system (e.g., a directory list command, a file copy command, a file move command, etc.).

Figure 3:
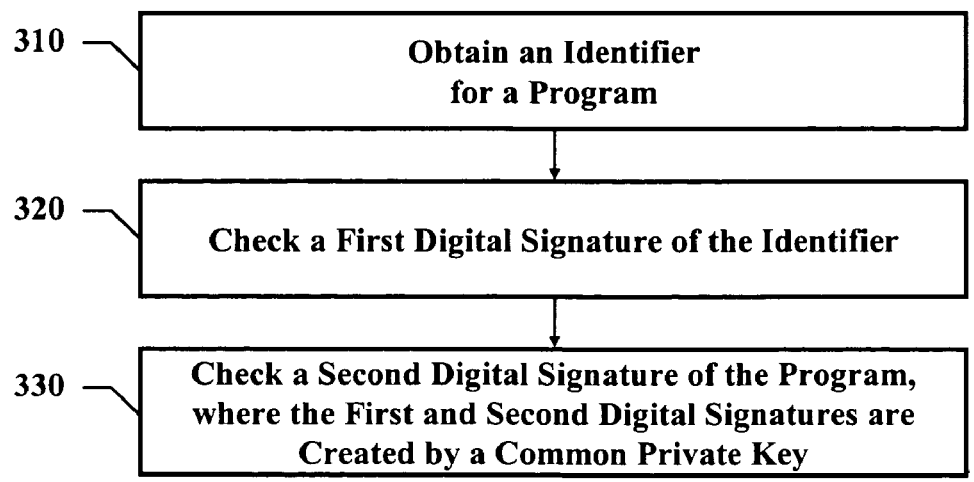
FIG. 3 is a flow chart showing an example process of authenticating a program before granting access to a virtual file system.

FIG. 3 is a flow chart showing an example process of authenticating a program before granting access to a virtual file system. An identifier can be obtained 310 for a program. This can involve the runtime retrieving the identifier automatically when the program is invoked on a computer. For example, when the program starts running, the first code that is run can be that of the runtime, which can look up the strong name of the program (as well as possibly other signed identifiers and other data regarding the program), and the runtime can authenticate the program for access to one or more storage areas before the program's code is run. Obtaining the identifier can involve receiving the identifier from the program through an API call to the runtime, such as a call to the file access routine 145, or a call to another API routine used specifically for authentication of the program for access to the virtual file system.

A first digital signature of the identifier can be checked 320, and a second digital signature of the program can be checked 330 to authenticate the program for the identifier. The first and second digital signatures can be created by a common private key, and the runtime library can include the public key corresponding to the common private key. By checking the signature of the program and the signature of the identifier using the public key, the runtime can confirm that the identifier and the program have both been signed by the owner of the private key, and thus, the program has a legitimate claim to present that identifier and use that identifier to access a corresponding persistent storage area.

The digital signature of the identifier can be a strong name of the program that is obtained at program startup, in which case, the program's name can be used to identify the program's private virtual file system sandboxed in the local storage. Alternatively, the strong name can be associated with one or more identifiers, including one used to identify the program's private virtual file system sandboxed in the local storage, and the program can be authenticated for use of each of the one or more identifiers by checking the strong name. The strong name can be checked using traditional strong name techniques.

The digital signature of the program can be a signature of the whole program code or parts thereof. The digital signature of the program can be checked using a traditional public certificate associated with the program. The public certificate can be bundled with the program and/or can be issued by a Certificate Authority. Checking the signature of the program can involve processing more than one certificate (e.g., the first one being bundled with the program, and others being accessible over a network). In any event, the identifier specifies a virtual file system partition that may be exposed to the calling program, and the cross check of the digital signature of the identifier with that of the calling program allows the runtime to confirm the program is authorized to access the specified virtual file system partition.

The runtime library can include multiple public keys for checking signatures of other identifiers and other programs, and the full set of public keys used by the runtime can be configurable, such that public keys can be added or removed from the runtime library after it is installed on a given computer. Furthermore, other authentication and authorization operations can be performed by the runtime. For example, a virtual file system partition can be shared among multiple programs and also have access restrictions/privileges associated with the various programs (e.g., program alpha may have full read/write access to the partition while program beta may only have read access to the partition), and the runtime can enforce these access restrictions/privileges as well.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. A URI scheme used by the runtime library can allow addressing of volatile memory in addition to persistent storage. Moreover, the URI scheme can be developed such that the full file I/O (input/output) semantics (read, write, copy, etc.) are handled by the runtime, and the program can treat local files like remote files. For example, the virtual file system manager can implement a remote file management protocol (e.g., WebDAV (Web-based Distributed Authoring and Versioning)) that is also supported locally, and the runtime on a computer (which can be a traditional client-side personal computer) can handle the difference in processing local versus remote accesses without exposing those differences to the calling program (e.g., the runtime can handle the WebDAV headers and data used for remote file access).

What is claimed is:

1. A method comprising: operating on, and interfacing with an operating system of, a computer; providing runtime services, including a virtual file system, to a first program running on the computer and a second program running on the computer, the providing runtime services comprising:
receiving, from the first program, first information and second information through a single file access routine of an application program interface (API) for the virtual file system;
determining a selected one of multiple file storage areas to access based on the first information, the multiple file storage areas including a first area and a second area, the first area being local to the computer, accessible by the first program through the virtual file system and inaccessible by the second program through the virtual file system, and the second area being accessible by the first program and the second program through the virtual file system;

mapping the second information to one or more file resources in the selected file storage area in the virtual file system; and accessing the one or more file resources for the first program; wherein the providing runtime services comprises providing runtime services, including the virtual file system, to a third program running on the computer; wherein the first area is accessible by the first and third programs through the virtual file system.

2. The method of claim 1, wherein the providing runtime services comprises authenticating the first program based at least in part on an identifier associated with the first program.

3. The method of claim 2, wherein the first information comprises the identifier.

4. The method of claim 2, wherein the providing runtime services comprises authenticating the third program based at least in part on the identifier associated with the first program and with the third program.

5. The method of claim 2, wherein the second area is remote from the computer and accessible over a communication network.

6. The method of claim 2, wherein the authenticating comprises checking a digital signature for the first program.

7. The method of claim 6, wherein the checking comprises:
checking a first digital signature of the identifier; and
checking a second digital signature of the first program;
wherein the first and second digital signatures are created by a common private key.

8. The method of claim 1, wherein receiving the first information and the second information comprises receiving a character string through the single file access routine of the API for the virtual file system, the character string comprising the first information and the second information.

9. The method of claim 8, wherein the character string conforms to a Universal Resource Identifiers (URI) specification used for network communications.

10. A non-transitory computer-readable medium encoding a computer program product operable to cause data processing apparatus to perform operations comprising:
interfacing with an operating system of a computer while running on the computer;
providing runtime services, including a virtual file system, to a first program running on the computer and a second program running on the computer, the providing runtime services comprising:
receiving, from the first program, first information and second information through a single file access routine of an application program interface (API) for the virtual file system;
determining a selected one of multiple file storage areas to access based on the first information, the multiple file storage areas including a first area and a second area, the first area being local to the computer, accessible by the first program through the virtual file system and inaccessible by the second program through the virtual file system, and the second area being accessible by the first program and the second program through the virtual file system;
mapping the second information to one or more file resources in the selected file storage area in the virtual file system; and
accessing the one or more file resources for the first program; wherein the providing runtime services comprises providing runtime services, including the virtual file system, to a third program running on the computer; wherein the first area is accessible by the first and third programs through the virtual file system.

11. The computer-readable medium of claim 10, wherein the providing runtime services comprises authenticating the first program based at least in part on an identifier associated with the first program.

12. The computer-readable medium of claim 11, wherein the first information comprises the identifier.

13. The computer-readable medium of claim 11, wherein the providing runtime services comprises authenticating the third program based at least in part on the identifier associated with the first program and with the third program.

14. The computer-readable medium of claim 11, wherein the second area is remote from the computer and accessible over a communication network.

15. The computer-readable medium of claim 11, wherein the authenticating comprises checking a digital signature for the first program.

16. The computer-readable medium of claim 15, wherein the checking comprises:
checking a first digital signature of the identifier; and
checking a second digital signature of the first program;
wherein the first and second digital signatures are created by a common private key.

17. The computer-readable medium of claim 10, wherein receiving the first information and the second information comprises receiving a character string through the single file access routine of the API for the virtual file system, the character string comprising the first information and the second information.

18. The computer-readable medium of claim 17, wherein the character string conforms to a Universal Resource Identifiers (URI) specification used for network communications.

19. A system comprising: a processor; local storage coupled with the processor;
an operating system configured to facilitate access to the processor and the local storage; and
a runtime library configured to interface with the operating system while running on the processor,
the runtime library configured to provide runtime services, including a virtual file system, to a first program running on the processor and a second program running on the processor,
the runtime library including an application program interface (API) for the virtual file system configured to receive, from the first program, first information and second information through a single file access routine of the API for the virtual file system,
the runtime library configured to determine a selected one of multiple file storage areas to access based on the first information, the multiple file storage areas including a first area and a second area, the first area being in the local storage, accessible by the first program through the virtual file system and inaccessible by the second program through the virtual file system, and the second area being accessible by the first program and the second program through the virtual file system,
the runtime library configured to map the second information to one or more file resources in the selected file storage area in the virtual file system, and
the runtime library configured to access the one or more file resources for the first program;
wherein the runtime library is configured to provide runtime services, including the virtual file system, to a third program running on the processor; wherein the first area is accessible by the first and third programs through the virtual file system.

20. The system of claim 19, wherein the runtime library is configured to authenticate the first program based at least in part on an identifier associated with the first program.

21. The system of claim 20, wherein the first information comprises the identifier.

22. The system of claim 20, wherein the runtime library is configured to authenticate the third program based at least in part on the identifier associated with the first program and with the third program.

23. The system of claim 20, further comprising an interface device to connect to a communication network, wherein the second area is remote from the processor and accessible over the communication network.

24. The system of claim 20, wherein the runtime library is configured to authenticate the first program by checking a digital signature for the first program.

25. The system of claim 24, wherein the runtime library is configured to check a first digital signature of the identifier and a second digital signature of the first program; wherein the first and second digital signatures are created by a common private key.

26. The system of claim 19, wherein the runtime library is configured to receive a character string through the single file access routine of the API for the virtual file system, the character string comprising the first information and the second information.

27. The system of claim 26, wherein the character string conforms to a Universal Resource Identifiers (URI) specification used for network communications.

* * * * *